(12) United States Patent
Quenzi et al.

(10) Patent No.: US 8,317,215 B2
(45) Date of Patent: Nov. 27, 2012

(54) FIFTH WHEEL TRAILER WITH ADJUSTABLE DECK

(75) Inventors: Philip J. Quenzi, Atlantic Mine, MI (US); Richard W. Jenney, Naples, FL (US)

(73) Assignee: Absolute Electronic Solutions, Inc., Las Vegas, NV (US)

( * ) Notice: Subject to any disclaimer, the term of this patent is extended or adjusted under 35 U.S.C. 154(b) by 661 days.

(21) Appl. No.: 12/489,828

(22) Filed: Jun. 23, 2009

(65) Prior Publication Data

US 2009/0322057 A1 Dec. 31, 2009

Related U.S. Application Data

(60) Provisional application No. 61/076,426, filed on Jun. 27, 2008.

(51) Int. Cl.
B62D 53/06 (2006.01)

(52) U.S. Cl. .............. 280/425.1; 280/425.2; 280/441.1; 280/441.2

(58) Field of Classification Search .............. 280/425.1, 280/425.2, 441.1, 441.2
See application file for complete search history.

(56) References Cited

U.S. PATENT DOCUMENTS

| | | |
|---|---|---|
| 103,102 A | 5/1870 | Stuntz |
| 1,247,034 A | 11/1917 | Thompson |
| 1,336,131 A | 4/1920 | Christie |
| 1,376,649 A | 5/1921 | Schneider |
| 1,395,020 A | 10/1921 | Turnbull et al. |
| 1,443,619 A | 1/1923 | De Virel et al. |
| 1,443,963 A | 2/1923 | Monsen |
| 1,503,710 A | 8/1924 | Rice |
| 1,611,012 A | 12/1926 | Flowers |
| 1,638,009 A | 8/1927 | Cambessedes |
| 1,909,342 A | 5/1933 | Galanot |
| 1,937,062 A | 11/1933 | Kellett |
| 2,029,995 A | 2/1936 | Flowers |
| 2,032,840 A | 3/1936 | Flowers |
| 2,059,212 A | 11/1936 | Dorst |
| 2,189,052 A | 2/1940 | Anthony |
| 2,190,869 A | 2/1940 | Frentzel, Jr. et al. |

(Continued)

FOREIGN PATENT DOCUMENTS

| | | |
|---|---|---|
| JP | 06032168 A | 2/1994 |
| JP | 07-329627 | 12/1995 |
| JP | 07332893 A | 12/1995 |

OTHER PUBLICATIONS

International Search Report from corresponding PCT Application No. PCT/US2009/048235, dated Feb. 2, 2010, which corresponds to U.S. Appl. No. 12/489,828.
Written Opinion of the International Searching Authority from corresponding PCT Application No. PCT/US2009/048235, dated Feb. 2, 2010, which corresponds to U.S. Appl. No. 12/489,828.
U.S. Appl. No. 11/432,852, filed May 12, 2006.

Primary Examiner — Lesley D Morris
Assistant Examiner — Marlon Arce
(74) Attorney, Agent, or Firm — Gardner, Linn, Burkhart & Flory, LLP

(57) ABSTRACT

A cargo carrier trailer for movably supporting cargo includes a frame configured to support cargo at the cargo carrier trailer and at least two wheels at each side of the frame. Each of the wheels is rotatably mounted to a respective support arm. The support arms are pivotally mounted to a carriage assembly that is repositionable fore and aft along the frame of the cargo carrier. The support arms are pivotable relative to the carriage assembly and frame to adjust the height and tilt of the frame relative to a support surface. The cargo carrier trailer is readily adapted to position the frame at a lower position for road applications and a raised position for uneven terrain applications. The cargo carrier trailer is adapted to couple to a tow vehicle via a fifth wheel hitch.

22 Claims, 9 Drawing Sheets

U.S. PATENT DOCUMENTS

| | | | |
|---|---|---|---|
| 2,379,094 A | 6/1945 | Maxon, Jr. |
| 2,426,342 A | 8/1947 | Couse |
| 2,613,827 A | 10/1952 | Van Doorne |
| 2,653,032 A | 9/1953 | Ellis |
| 2,712,856 A | 7/1955 | MacPhee |
| 2,739,837 A | 3/1956 | Sykes |
| 2,741,383 A | 4/1956 | Leckert |
| 2,786,590 A | 3/1957 | Edwards et al. |
| 2,818,275 A | 12/1957 | Hollowell |
| 2,849,129 A | 8/1958 | Likens |
| 2,949,992 A | 8/1960 | Weinberg |
| 2,999,721 A | 9/1961 | Wood |
| 3,093,388 A | 6/1963 | Kulyk |
| 3,096,995 A | 7/1963 | Richnow, Jr. |
| 3,105,704 A | 10/1963 | Schramm |
| 3,120,408 A | 2/1964 | Pruss |
| 3,138,276 A | 6/1964 | Allen et al. |
| 3,150,867 A | 9/1964 | Droegkamp |
| 3,159,294 A | 12/1964 | Forsythe, Jr. |
| 3,173,671 A | 3/1965 | Broadwell |
| 3,210,120 A | 10/1965 | Gouin |
| 3,272,546 A | 9/1966 | Cooley |
| 3,305,110 A | 2/1967 | Tantlinger |
| 3,314,690 A | 4/1967 | Bunchak |
| 3,319,932 A | 5/1967 | Szczepanik |
| 3,328,019 A | 6/1967 | Wilson |
| 3,376,989 A | 4/1968 | Hilbun |
| 3,430,792 A | 3/1969 | Grove et al. |
| 3,439,790 A | 4/1969 | Langley et al. |
| 3,450,282 A | 6/1969 | Ezolt |
| 3,485,400 A | 12/1969 | Pewthers |
| 3,506,144 A | 4/1970 | Carder et al. |
| 3,520,549 A | 7/1970 | De Lay |
| 3,640,578 A | 2/1972 | Finney |
| 3,647,239 A | 3/1972 | Katsumori |
| 3,666,127 A | 5/1972 | Guyaux |
| 3,684,108 A | 8/1972 | Olson |
| 3,688,926 A | 9/1972 | Stefanelli |
| 3,689,106 A | 9/1972 | Young |
| 3,709,450 A | 1/1973 | Watts et al. |
| 3,734,538 A | 5/1973 | Humes |
| 3,741,582 A | 6/1973 | Eckert |
| 3,743,044 A | 7/1973 | Scheele |
| 3,762,487 A | 10/1973 | Bilas |
| 3,847,410 A | 11/1974 | Keijzer et al. |
| 3,874,538 A | 4/1975 | Kessler et al. |
| 3,893,540 A | 7/1975 | Beucher |
| 3,934,740 A | 1/1976 | Rumell |
| 3,944,096 A | 3/1976 | Carder |
| 3,987,919 A | 10/1976 | Weeks et al. |
| 4,015,735 A | 4/1977 | Berglund et al. |
| 4,015,879 A | 4/1977 | Shonkwiler |
| 4,036,528 A | 7/1977 | Langendorf |
| 4,049,251 A | 9/1977 | Masae |
| 4,077,532 A | 3/1978 | Bryan |
| 4,139,236 A | 2/1979 | Hill et al. |
| 4,146,104 A | 3/1979 | Leembruggen |
| 4,203,697 A | 5/1980 | Cayton |
| 4,249,843 A | 2/1981 | Kerr |
| 4,312,619 A | 1/1982 | Anderson et al. |
| 4,348,150 A | 9/1982 | Inghram et al. |
| 4,352,625 A | 10/1982 | Bolderoff |
| 4,364,574 A | 12/1982 | Saito |
| 4,372,572 A * | 2/1983 | Verschage | 280/441.2 |
| 4,373,738 A | 2/1983 | Lange |
| 4,452,496 A | 6/1984 | van der Lely |
| 4,455,118 A | 6/1984 | Scharf |
| 4,456,280 A | 6/1984 | Gevers |
| 4,478,431 A | 10/1984 | Muller et al. |
| 4,494,766 A | 1/1985 | McHugh et al. |
| 4,524,841 A | 6/1985 | Waggoner |
| 4,541,768 A | 9/1985 | Walker et al. |
| 4,568,094 A | 2/1986 | Lovell |
| 4,568,235 A | 2/1986 | Bills, Jr. |
| 4,572,527 A | 2/1986 | Stafford-Mills et al. |
| 4,593,810 A | 6/1986 | Cook |
| 4,638,887 A | 1/1987 | Kishi |
| 4,655,667 A | 4/1987 | Plumb et al. |
| 4,657,099 A | 4/1987 | Baltensperger |
| 4,673,328 A | 6/1987 | Shiels |
| 4,690,246 A | 9/1987 | Hornagold et al. |
| 4,694,930 A | 9/1987 | Kishi |
| 4,702,662 A | 10/1987 | Marlett |
| 4,737,063 A | 4/1988 | van den Pol |
| 4,770,592 A | 9/1988 | Winter |
| 4,787,808 A | 11/1988 | Shimoji et al. |
| 4,798,398 A | 1/1989 | Cummins |
| 4,806,061 A | 2/1989 | Fenton |
| 4,854,409 A | 8/1989 | Hillebrand et al. |
| 4,854,805 A | 8/1989 | Althoff et al. |
| 4,900,056 A | 2/1990 | Fukushima et al. |
| 4,995,772 A | 2/1991 | Biggio |
| 5,011,362 A | 4/1991 | Pijanowski |
| 5,013,056 A * | 5/1991 | Landoll et al. | 280/425.2 |
| 5,035,439 A | 7/1991 | Petrillo |
| 5,046,755 A | 9/1991 | Runkel |
| 5,069,507 A | 12/1991 | Lindsey |
| 5,110,153 A | 5/1992 | Kallansrude et al. |
| 5,113,958 A | 5/1992 | Holden |
| 5,118,241 A | 6/1992 | Cochran et al. |
| 5,137,297 A | 8/1992 | Walker |
| 5,146,948 A | 9/1992 | Runkel |
| 5,159,989 A | 11/1992 | Claxton |
| 5,165,838 A | 11/1992 | Kallansrude et al. |
| 5,167,295 A | 12/1992 | Moog |
| 5,184,366 A | 2/1993 | Rawdon et al. |
| 5,188,379 A | 2/1993 | Krause et al. |
| 5,191,951 A | 3/1993 | Bargfrede et al. |
| 5,192,189 A | 3/1993 | Murata et al. |
| 5,193,063 A | 3/1993 | Assh |
| 5,211,413 A | 5/1993 | Williams et al. |
| 5,219,259 A | 6/1993 | Cochran et al. |
| 5,246,247 A | 9/1993 | Runkel |
| 5,246,329 A | 9/1993 | Farrell |
| 5,246,330 A | 9/1993 | Marmur et al. |
| 5,269,641 A | 12/1993 | Cochran et al. |
| 5,285,205 A | 2/1994 | White |
| 5,328,320 A | 7/1994 | Farrow et al. |
| 5,344,124 A | 9/1994 | Runkel |
| 5,348,330 A | 9/1994 | Few et al. |
| 5,372,353 A | 12/1994 | West |
| 5,417,540 A | 5/1995 | Cox |
| 5,458,218 A | 10/1995 | Runkel |
| 5,467,827 A | 11/1995 | McLoughlin |
| 5,505,481 A | 4/1996 | VanDenberg et al. |
| 5,529,454 A | 6/1996 | Alm et al. |
| 5,547,211 A | 8/1996 | Runkel |
| 5,624,105 A | 4/1997 | Runkel |
| 5,630,694 A | 5/1997 | Ihara |
| 5,662,453 A | 9/1997 | Gerstner et al. |
| 5,769,502 A | 6/1998 | Bettini |
| 5,775,868 A * | 7/1998 | Mann | 414/475 |
| 5,778,798 A | 7/1998 | VanDenberg |
| 5,851,099 A | 12/1998 | Garcia |
| 5,871,328 A | 2/1999 | Pinkston |
| 5,904,364 A * | 5/1999 | Wylezinski et al. | 280/401 |
| 5,971,493 A | 10/1999 | Robert |
| 6,036,207 A | 3/2000 | Oehlerking et al. |
| 6,045,316 A | 4/2000 | Dole |
| 6,102,418 A | 8/2000 | Runkel |
| 6,120,052 A | 9/2000 | Capik et al. |
| 6,171,047 B1 | 1/2001 | Vandervalk |
| 6,176,505 B1 | 1/2001 | Capik et al. |
| 6,276,890 B1 | 8/2001 | Pratt |
| 6,299,181 B1 | 10/2001 | Ericksson |
| 6,447,044 B1 | 9/2002 | Buker et al. |
| 6,520,736 B2 | 2/2003 | Pratt |
| 6,547,335 B2 | 4/2003 | McSweeney |
| 6,783,187 B2 | 8/2004 | Parsons |
| 6,796,572 B1 * | 9/2004 | McGhie | 280/426 |
| 7,134,829 B2 | 11/2006 | Quenzi et al. |
| 7,510,205 B2 * | 3/2009 | Bellezza Quater et al. | 280/492 |
| 7,618,227 B2 * | 11/2009 | Smith | 414/484 |
| 7,950,685 B2 * | 5/2011 | Hagenbuch | 280/423.1 |
| 2002/0036392 A1 | 3/2002 | Damron |
| 2004/0080206 A1 | 4/2004 | Parsons |

* cited by examiner

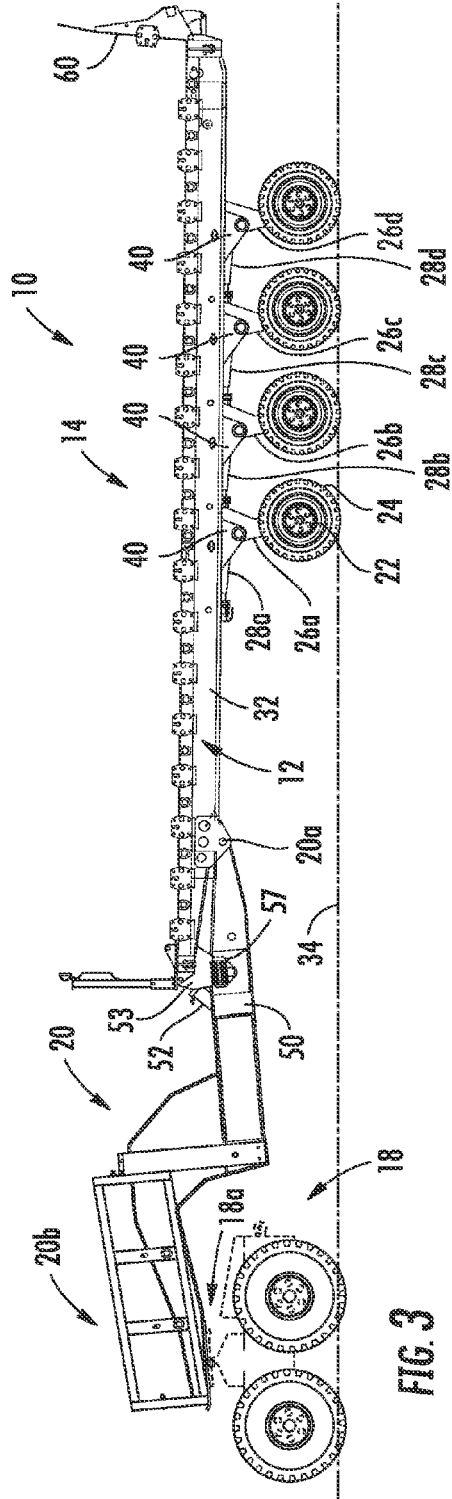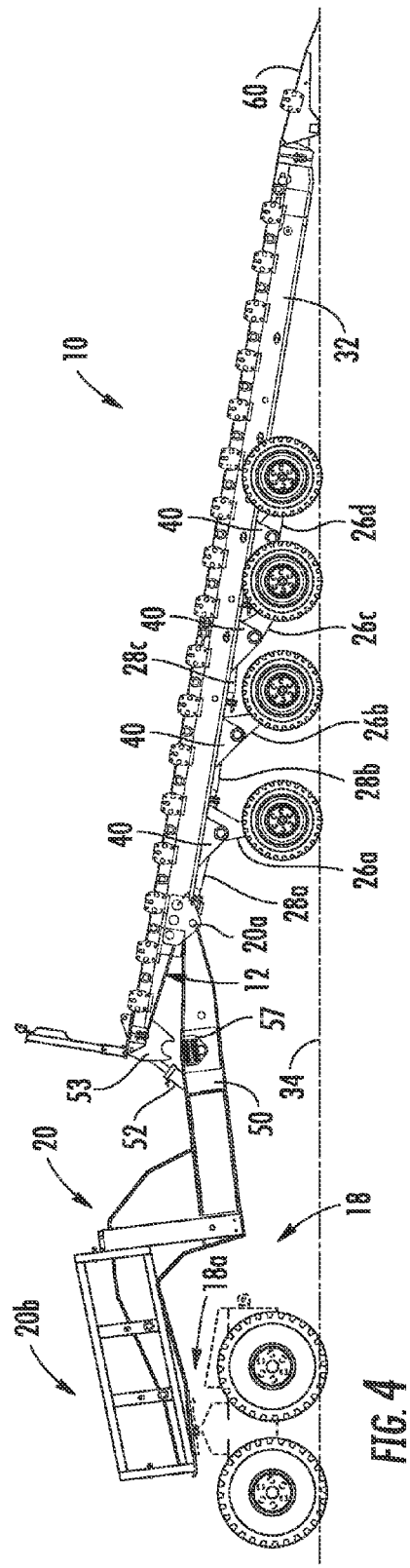

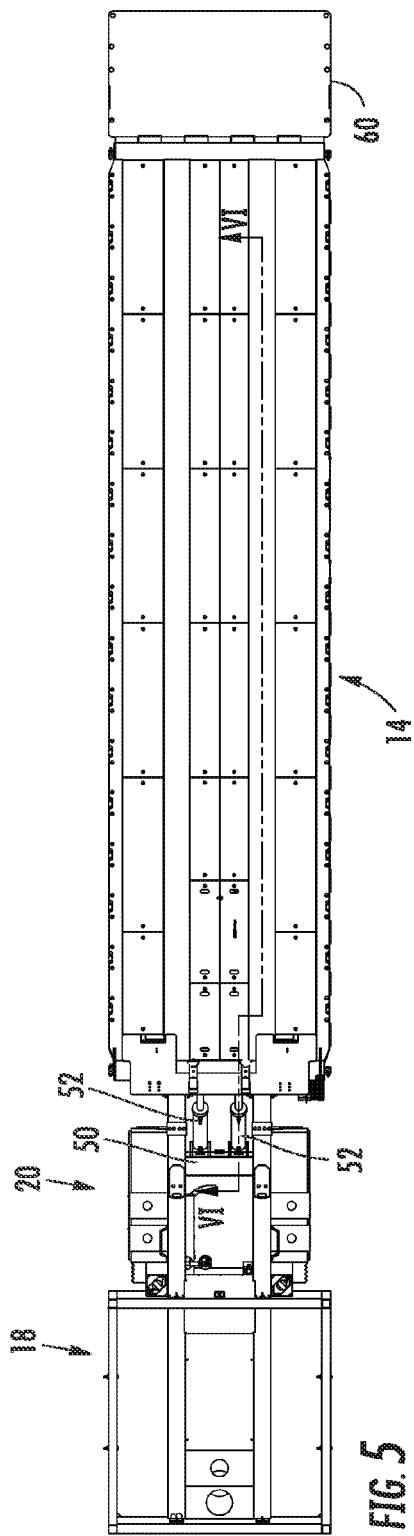
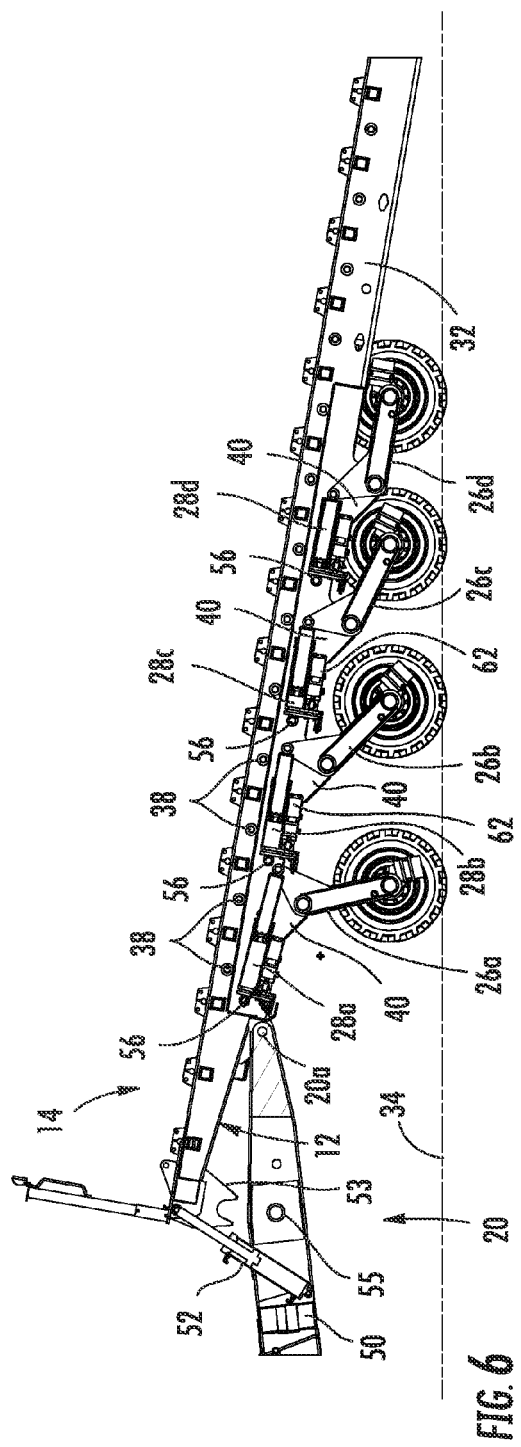

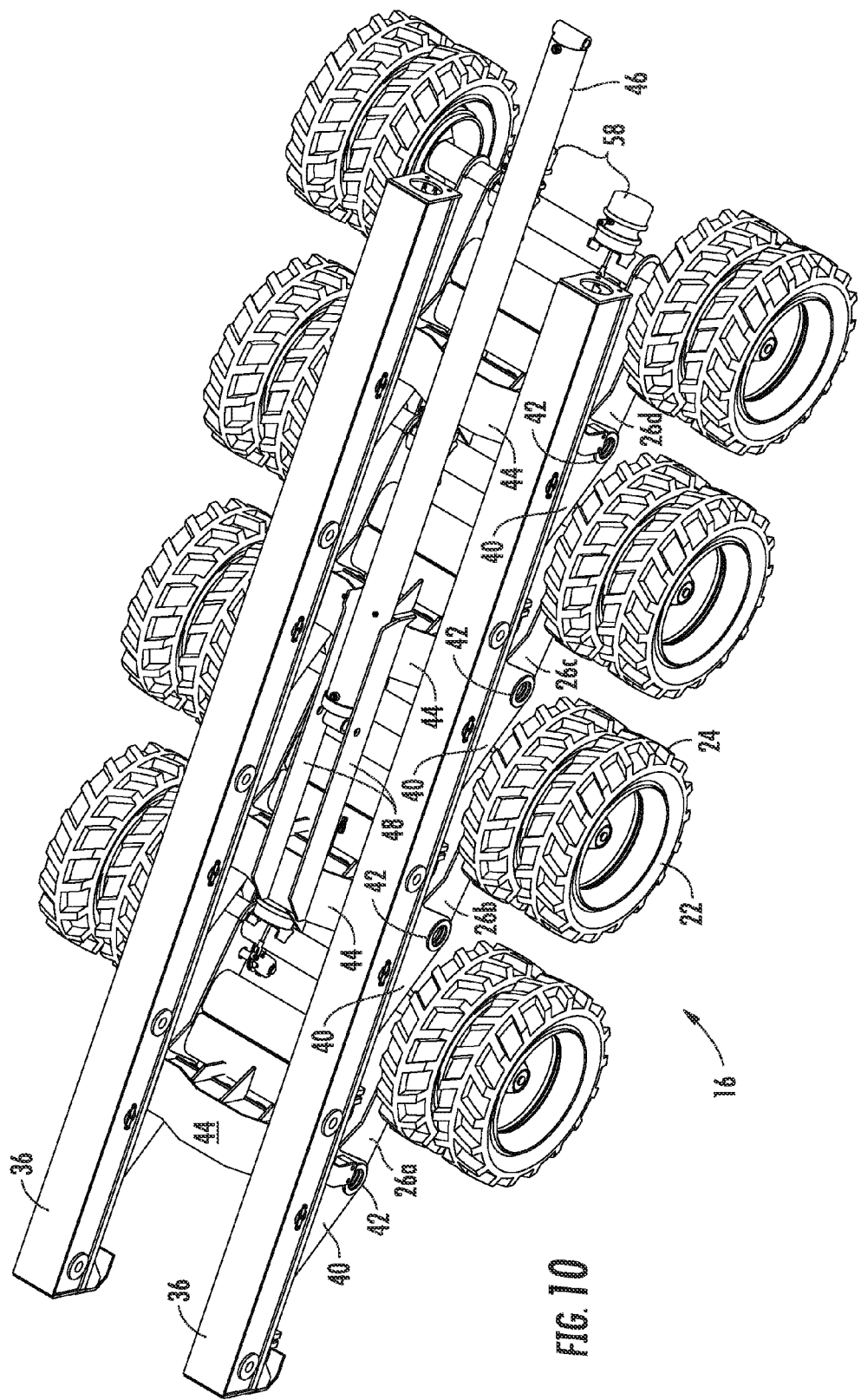

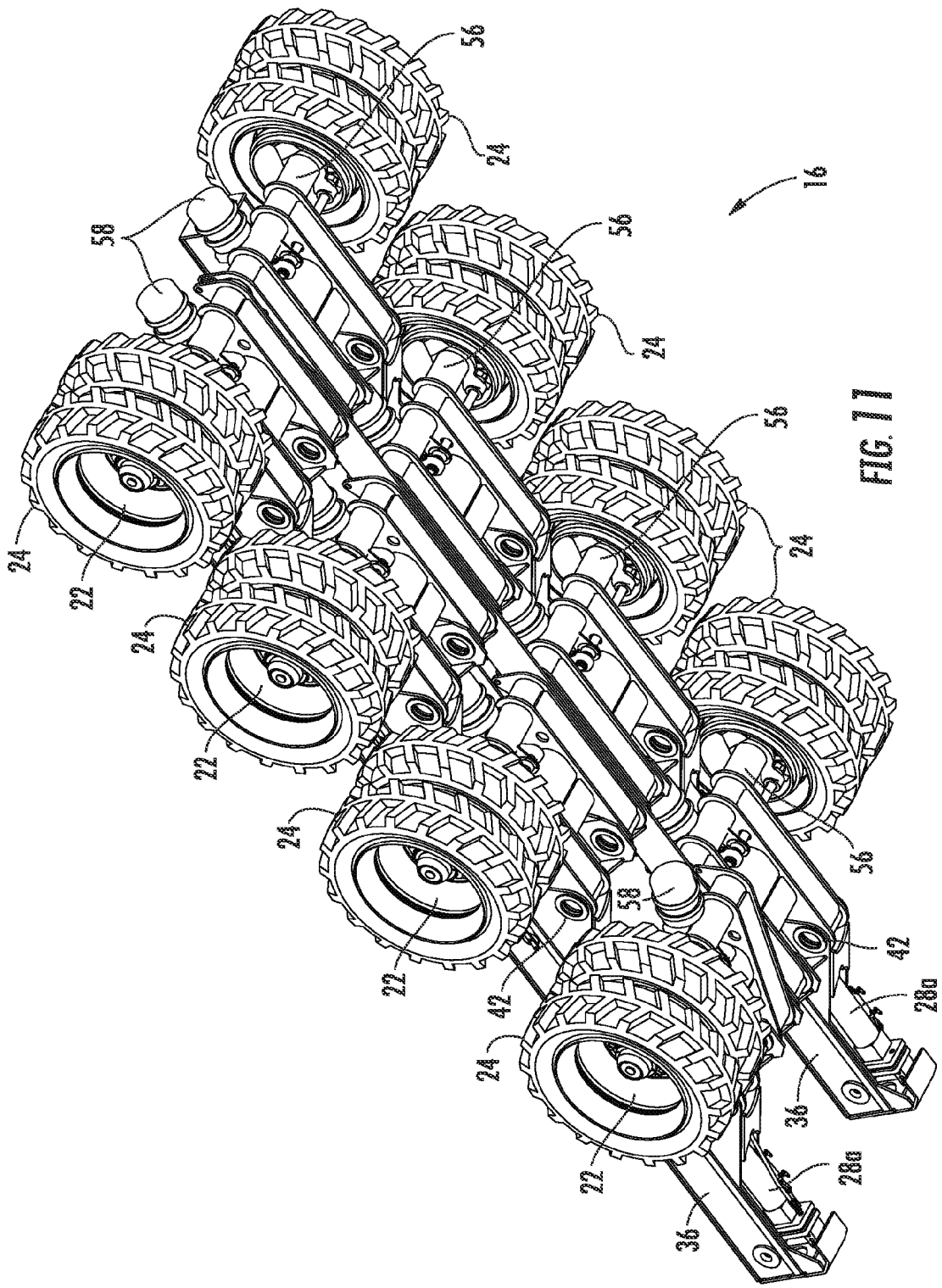

FIFTH WHEEL TRAILER WITH ADJUSTABLE DECK

CROSS REFERENCE TO RELATED APPLICATION

The present application claims benefit of U.S. provisional application Ser. No. 61/076,426, filed Jun. 27, 2008, which is hereby incorporated herein by reference in its entirety.

FIELD OF THE INVENTION

The present invention relates generally to a trailer for carrying cargo and, more particularly, to a "fifth wheel" trailer that may carry cargo on a deck of the trailer that is adjustable relative to the wheels and tires of the trailer.

BACKGROUND OF THE INVENTION

Trailers for carrying cargo are generally known. Such known trailers or vehicles often include a frame or deck supported by wheels and axles and allow for adjustment of the height of the deck relative to the ground. The axles may include a suspension system for absorbing the impact of the tires with the ground as the trailer or vehicle travels over uneven terrain. The ground clearance of such trailers or vehicles is typically limited by the size of the wheels and tires.

SUMMARY OF THE INVENTION

The present invention provides a cargo carrier trailer that includes a support system for movably supporting a frame and a deck above a plurality of wheels and tires, and that is towable via a fifth wheel connection to a tow vehicle. The wheels are rotatably mounted to individual respective support arms, which are pivotally and adjustably mounted to the frame of the carrier. Pivotal movement of the support arms functions to raise and lower and/or tilt the frame of the carrier fore/aft and left/right to a desired height and/or tilt angle. The support arms thus function to adjustable support the carrier frame, but also function as a suspension system or shock absorbers for the cargo carrier.

According to an aspect of the present invention, a cargo carrier-trailer or fifth wheel trailer for movably supporting cargo includes a frame configured to support cargo at the cargo carrier trailer and at least two wheels rotatably mounted to a respective support arm at each side of the frame. A tongue assembly is coupled to the frame at a forward end portion of the frame, and facilitates coupling the fifth wheel trailer to a fifth wheel receiver on a tow vehicle. The wheels are independently mounted to the respective support arms, and the support arms are pivotally mounted to respective sides of a carriage assembly. The support arms are pivotable relative to the carriage assembly to adjust at least one of a height and tilt of the frame relative to a support surface. The cargo carrier trailer is readily adapted to position the frame at a lower position for road applications, and a raised position for uneven terrain applications and/or for loading and unloading at a raised platform.

Optionally, the carriage assembly is movable longitudinally along the frame to facilitate fore/aft tilting of the deck. For example, the carriage assembly may be positionable in a forward position in which an aft end of the cargo carrier trailer is lowered-toward the support surface. A pair of forward support arms and a pair of rearward support arms may be upwardly and downwardly pivotable to adjust a height and/or the fore/aft tilt of the frame, and may be cooperatively adjusted so that the support arms and wheels may be adapted to support the frame or deck at different support surface levels.

Optionally, the tongue assembly may be pivotably coupled to the forward end portion of the frame and includes an actuator for pivoting the tongue assembly relative to the frame to thereby raise and lower the forward end portion of the frame. Optionally, the actuator may comprise a double-acting actuator that extends to raise the forward end portion of the frame and retracts to lower the forward end portion of said frame. The actuator pivots the tongue assembly to assist in fore/aft tilting of the deck, and may be actuated in combination with repositioning the carriage assembly and pivoting the support arms to tilt the deck.

Therefore, the present invention provides a cargo carrier trailer or fifth wheel trailer that has a frame for supporting articles thereon with the frame being raisable and lowerable and tiltable relative to the wheels and tires and support surface or ground via pivotal movement of support arms that extend from a movable carriage assembly and have respective wheels and tires mounted thereon. The cargo carrier trailer thus may be readily adjustable via pivotal movement of the support arms to set the frame (and a deck mounted thereon) at a desired height or tilt angle to ease loading and unloading of the cargo carrier. The wheels and tires are rotatably mounted to the separate respective support arms such that corresponding wheels on opposite sides of the cargo carrier trailer are independently raisable and lowerable. The support arms and associated actuators function to adjust the height and tilt angle of the frame and also function as a suspension system for the cargo carrier.

These and other objects, advantages, purposes, and features of the present invention will become apparent upon review of the following specification in conjunction with the drawings.

BRIEF DESCRIPTION OF THE DRAWINGS

FIG. 3 is a side elevation of the cargo carrier trailer of FIG. 1, with the deck of the trailer in a fully raised position;

FIG. 4 is a side elevation of the cargo carrier trailer of FIG. 1, with the deck of the trailer in an aft-tilted position;

FIG. 5 is a top plan view of the cargo carrier trailer of FIG. 4;

FIG. 6 is a side sectional view of the cargo trailer taken along the line VI-VI of FIG. 5;

FIG. 10 is a perspective view of a carriage assembly useful with a cargo trailer of the present invention;

FIG. 11 is a lower perspective view of the carriage assembly of FIG. 10, with the front left wheel assembly in a lowered position;

DESCRIPTION OF THE PREFERRED EMBODIMENTS

Figure 1:
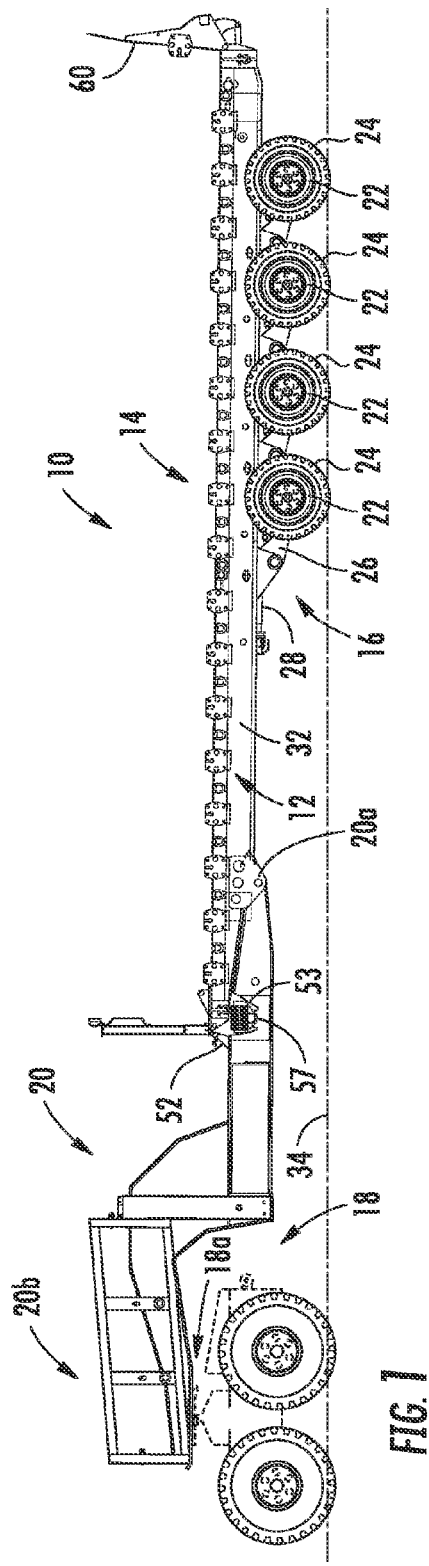
FIG. 1 is a side elevation of a cargo carrier trailer in accordance with the present invention, with the deck of the trailer in a travel position.

Referring now to the drawings and the illustrative embodiments depicted therein, a fifth wheel cargo carrier trailer 10 includes a frame or frame portion 12 and a deck or deck portion 14 mounted to the frame 12, which is supported by a support system or carriage assembly 16 (FIGS. 1-9). Cargo carrier trailer 10 is connectable to a tow vehicle 18 via a fifth wheel hitch member or tongue assembly 20 at a forward end of the cargo carrier. Carriage assembly 16 includes wheels 22 and tires 24 rotatably mounted to support arms or members or elements 26, which are adjustably or pivotably mounted to carriage assembly 16. Each wheel 22 and tire 24 (or two wheels and tires in tandem, as can be seen in FIGS. 7, 8, 10, and 11) is/are rotatably mounted to a respective support arm 26. Thus, the frame or deck of cargo carrier trailer 10 may be adjusted or raised to provide increased ground clearance and enhanced handling capabilities on uneven terrain, as discussed below.

Figure 13:
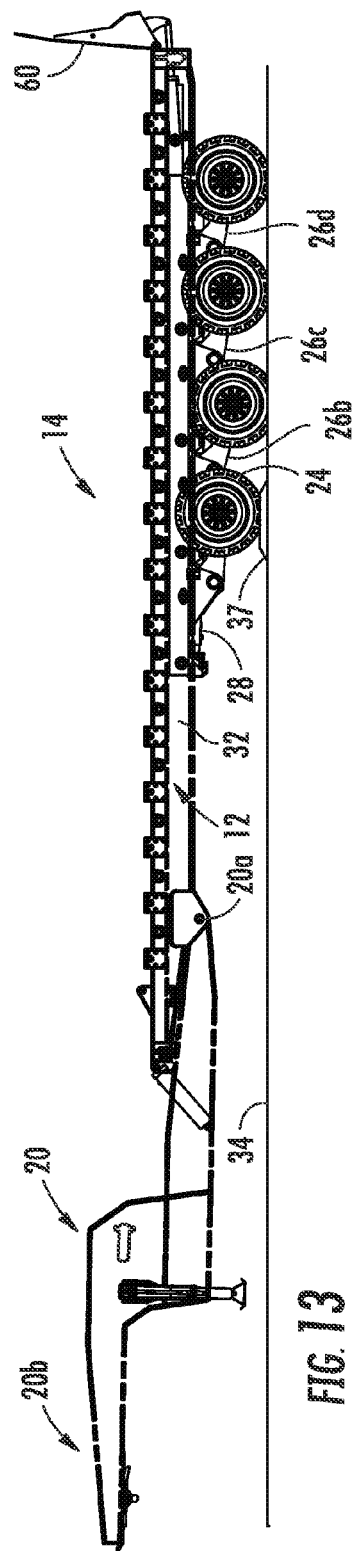
FIG. 13 is a side elevation of the cargo carrier trailer of FIG. 1, with the front left wheel assembly positioned atop an obstacle.

Carriage assembly 16 includes support arm actuators 28, such as hydraulic cylinders or the like, for independently or cooperatively adjusting or pivoting the support arms 26 to raise and lower the frame 12 and deck 14, as discussed below. The actuators 28 extend and retract to adjust the pivot angle of the support arms 26 relative to the frame to adjust the height of the frame 12 and deck 14, and also act as the suspension system for the wheels and tires to absorb the impacts of the tires against objects (FIG. 13) such as may occur as the cargo carrier trailer travels over uneven terrain, as also discussed below. In the illustrated embodiment, carriage assembly 16 includes four support arms 26a-d and respective actuators 28a-d, which include a pair of forward support arms 26a and respective actuators 28a and a pair of rearward support arms 26d and respective actuators 28d, and wheels 22 and tires 24. The carriage assembly 16 thus includes a pair of forward support arms 26a and respective actuators 28a, a pair of forward center support arms 26b and respective actuators 28b, a pair of rearward center support arms 26c and respective actuators 28c, and a pair of rearward support arms 26d and respective actuators 28d.

In the illustrated embodiment, support arms 26 are pivotally mounted to carriage assembly 16 and may substantially raise and lower the frame 12 and deck 14 via pivotal movement of any combination of support arms 26a, 26b; 26c, 26d relative to frame 12, such as via extension and retraction of the respective actuators 28a, 28b, 28c, 28d (which may also be pivotally mounted to carriage assembly 16 at a longitudinally different location along the frame relative to the mounting location of the respective support arms). As can be seen with reference to FIGS. 1-4, 6, and 9-11, the support arms 26 pivot in the same direction as one another, such that the support arms pivot or angle rearward from a forwardly located pivot axis. It will be appreciated that support arms 26 may pivot either forward (and downward) or rearward (and upward), or different support arms may pivot either forward or rearward in combination with oppositely pivoted support arms, without departing from the spirit and scope of the present invention.

Support arms 26a-d comprise substantially rigid support arms that pivotally mount to the longitudinal carriage frame members 36 and that have the wheels rotatably mounted thereto (such as to a respective partial axle 54 (FIG. 11) at the lower end of each support arm). The actuators 28a-d are pivotally mounted to longitudinal carriage frame members 36 at pivot mounts 56 (FIG. 6). Thus, the actuators provide a suspension function to the support system by compressing or retracting when the tires impact an object or bump 37 (FIG. 13) to act as shock absorbers for the cargo carrier. The angle of the support arms relative to the carriage frame members 36 thus may be selectively adjusted via respective actuators 28a-d. Optionally, solid axles may be provided at the carriage assembly, rather than partial axles and independent suspension, such that actuators on opposite sides of the axles are not fully independently operable. For example, solid axle units may lack the ability to tilt the trailer left and right.

Actuators 28a-d are also pivotally mounted at one of their ends to carriage assembly 16 and with the other ends pivotally attached to their respective support arms. For example, actuators 28a-d may comprise hydraulic cylinder actuators with a hydraulic cylinder pivotally mounted at the frame member 36 of carriage assembly 16, and with a piston rod pivotally attached to the respective support arm at a location along the support arm below the upper end of the support arm. Thus, extension and retraction of the actuators 28 imparts a corresponding pivotal movement of the respective support arms 26 relative to carriage assembly 16, while the actuators 28 may also pivot relative to carriage assembly 16 during extension/retraction of the actuators and pivotal movement of the support arms. Optionally, the actuators 28a-d comprise hydraulic cylinders with integral accumulators (for selectively absorbing fluid from respective cylinders when the cylinders are compressed) to provide desired lift and suspension characteristics, and may include a quarter-turn ball valve or the like, such as between the accumulator and the cylinder, so that the accumulator can be bypassed or locked out so as to provide a stable platform, as will be described in greater detail below.

In the illustrated embodiment, the support arms 26 are pivotally mounted to one of two longitudinal carriage frame members 36, with each longitudinal carriage frame member 36 being movably or slidably engaged with a corresponding longitudinal frame member 32 so that carriage frame members 36 are longitudinally or fore/aft adjustable relative to frame members 32. Frame members 32 include a plurality of wheels or rollers 38 (FIG. 6) disposed in a channel defined by each longitudinal frame member 32, with the rollers 38 supporting longitudinal carriage frame members 36 inside frame members 32. Mounting brackets 40 are rigidly coupled to longitudinal carriage frame members 36 and provide pivot supports 42 for support arms 26. Corresponding left and right mounting brackets 40 are connected via cross members 44, which couple left and right sides of carriage assembly 16 and provide one or more mounting surfaces for a fore/aft carriage assembly actuator 46.

As can be seen in FIG. 10, one end of carriage assembly actuator 46 is coupled to carriage assembly 16 via a bracket 48 attached to cross members 44, while an opposite end of carriage assembly actuator 46 is coupled to frame portion 12 of cargo trailer 10. In the illustrated embodiment, carriage assembly actuator 46 comprises a double-acting cylinder for positioning carriage assembly 16 between a rearward position (FIGS. 1-3 and 9) and a forward position (FIGS. 4 and 6). In the illustrated embodiment, carriage assembly actuator 46 is coupled to frame portion 12 at a position located aft of bracket 48 such that extension of carriage assembly actuator 46 causes carriage assembly 16 to move forward relative to frame portion 12, with longitudinal carriage frame members 36 engaging and moving along rollers 38 (FIG. 6) in the channels of longitudinal frame members 32. In order to reposition carriage assembly 16 to an aft position, carriage assembly actuator 46 is retracted, thus drawing carriage assembly 16 aft relative to frame portion 12 and deck portion 14 of cargo trailer 10.

Figure 2:
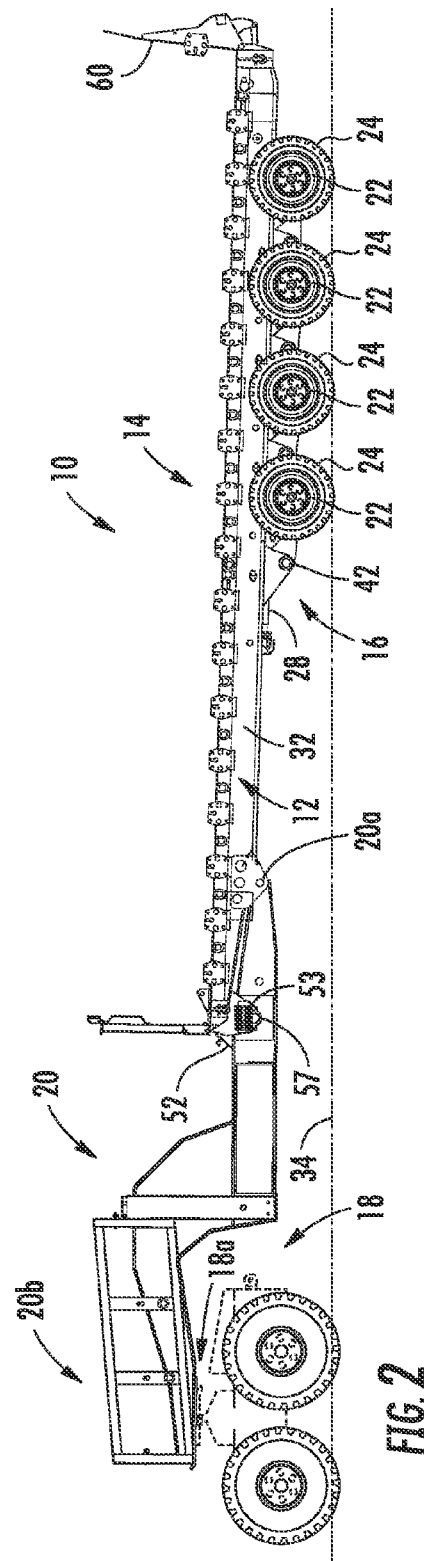
FIG. 2 is a side elevation of the cargo carrier trailer of FIG. 1, with the deck of the trailer in a lowered position.

Carriage assembly 16 is operable to selectively pivot the support arms 26 (via extension and retraction of corresponding actuators 28) to adjust the height, fore/aft tilt, and left/right-tilt of frame 12 and deck 14. Because the actuators 28a-d are mounted to longitudinal carriage frame members 36 at different locations than the respective support arms 26a-d, extension and retraction of the actuators causes pivotal movement of the support arms about their respective generally horizontal pivot axes at the frame members 36, which in turn causes a generally forward/downward and rearward/upward movement of the wheels and tires relative to frame members 36. For example, extension of actuators 28a-d causes pivotal movement of support arms 26a-d to raise or elevate frame 12 and deck 14 above the ground 34, while retraction of actuators 28a-d causes pivotal movement of support arms 26a-d in the opposite direction to lower frame 12 and deck 14 toward the ground (FIG. 2). Extension or retraction of one or more of the sets of actuators 28a-d (such as while the other actuators extend or retract to a lesser extent, or move in the opposite direction) may cause a fore/aft tilting of the frame and deck relative to the ground, as discussed below.

Deck portion 14 may comprise a generally flat deck or platform, or may comprise other configurations depending on the type of cargo that is being carried by the cargo carrier. For example, the deck may include conveying devices to assist in moving articles along the deck, if desired. In the illustrated embodiment, the deck is fixedly mounted to the frame portion 12. Optionally, frame portion 12 may support articles directly thereon without a deck attached thereto, while remaining within the spirit and scope of the present invention.

Frame 12 may comprise any suitable frame structure for movably mounting a carriage assembly 16 thereto, and for supporting deck 14. In the illustrated embodiment, and as best seen with reference to FIG. 6 (which depicts carriage assembly 16 in a forward position along frame 12), the frame includes a pair of longitudinal members 32 extending substantially the length of cargo carrier trailer 10. Fifth wheel tongue assembly 20 is pivotally mounted near a forward end portion of longitudinal members 32, and is pivotable to adjust the angle of fifth wheel tongue assembly 20 relative to frame 12 and/or to cause fore/aft tilting of the frame 12 relative to the support surface or ground 34, as discussed below.

Fifth wheel hitch member or tongue assembly 20 is pivotally attached at a forward end of frame portion 12 and is pivotable about a generally horizontal lateral pivot axis 20a so that the connecting end 20b of tongue assembly 20 may be readily vertically adjusted to align and connect with a towing portion 18a of tow vehicle 18. In the illustrated embodiment, fifth wheel tongue assembly 20 is pivotable about pivot axis 20a via a pair of double-acting tongue actuators 52, which are connected at one end to a cross member 50 (FIGS. 5 and 6) and at their other end to a forward end portion of frame 12. Extension and retraction of actuators 52 causes pivotal movement of fifth wheel tongue assembly 20 about pivot axis 20a to raise and lower the forward end portion of frame portion 12. Thus, extension and retraction of actuators 52 and the corresponding pivotal movement of fifth wheel tongue assembly 20 causes tilting of the frame 12 and deck 14 about a generally horizontal and laterally extending pivot axis, as discussed below. For example, the actuators 52 may be extended to tilt the rear of the deck toward the ground, such as shown in FIGS. 4 and 6, and as discussed below.

In the illustrated embodiment, the forward end portion of frame 12 includes a coupler or receiver 53 that engages or receives a pin or projection 55 of tongue assembly 20 when actuators 52 are retracted to level the trailer (FIGS. 1 and 2) to limit or substantially prevent tongue assembly 20 from pivoting beyond its normal operating limits, and to relieve the compressive loads that might otherwise be placed on actuators 52 during normal towing operations. When actuators 52 extend to raise the forward end of frame 12 (FIG. 6), coupler 53 disengages from projection 55 and is raised above the projection until the frame is once again lowered. Optionally, a locking assembly 57 (FIGS. 1-4) may be provided at projection 55 to lockably engage coupler 53 when the coupler engages the projection. Locking assembly 57 rigidly couples frame 12 to tongue assembly 20 to limit or substantially prevent the front end portion of frame 12 from bouncing or rising upwardly, or from applying large extension forces to actuators 52 during towing operations, such as when towing the trailer over rough terrain. Locking assembly 57 may be manually or automatically released from coupler 53 prior to pivoting tongue assembly 20 relative to frame 12.

Figure 9:
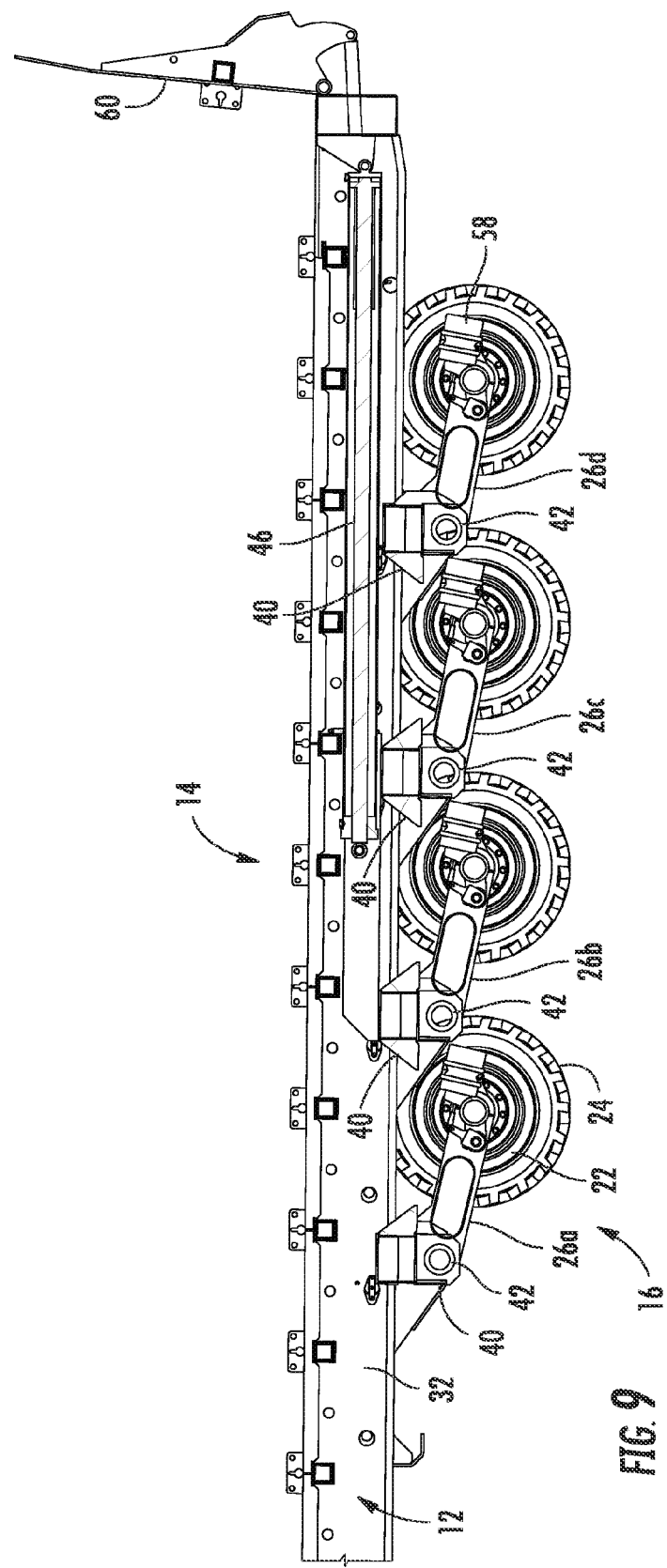
FIG. 9 is a side sectional elevation of the cargo trailer, taken along the line IX-IX in FIG. 8.

Optionally, and as shown in FIGS. 6 and 9, carriage assembly 16 may include a braking device or actuator 58 at some or all of the wheels to provide braking or control of the wheels as the cargo carrier trailer is moved along the road or ground. In the illustrated embodiment, braking device 58 comprises a pneumatic braking device, such as is known in the art and as discussed in commonly assigned U.S. Pat. No. 7,357,435, which is hereby incorporated herein by reference in its entirety. Optionally, the carriage assembly 16 may include one or more drive motors (not shown), such as hydraulic drive motors or the like, at one or more of the wheels, to provide a drive function to facilitate movement of the trailer when the trailer is not connected to a towing vehicle.

Figure 7:
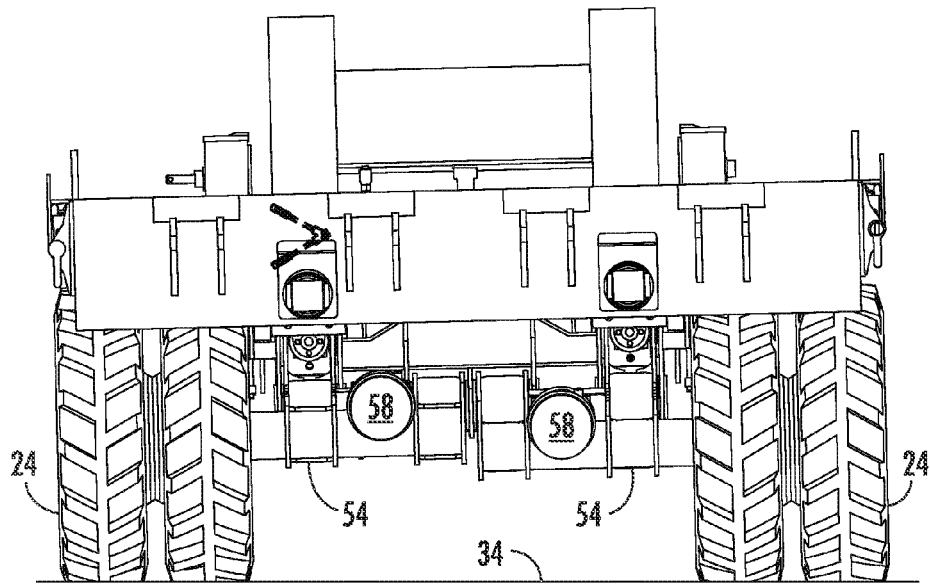
FIG. 7 is a rear end elevation of the cargo trailer of FIG. 1, with the deck removed and the trailer in a left-tilt position.
Figure 8:
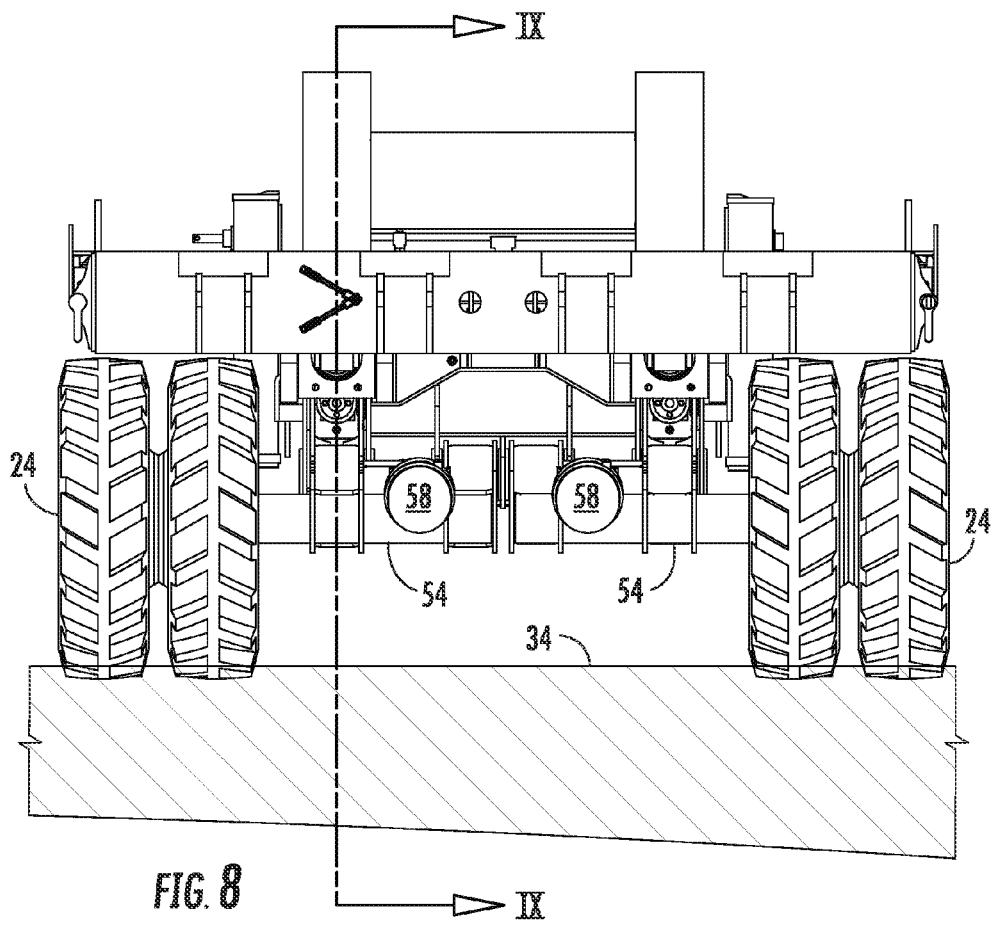
FIG. 8 is a rear end elevation of the cargo trailer of FIG. 1, with the deck of the trailer in a left/right level position.

In the illustrated embodiment, support arm actuators 28a-d, tongue assembly actuators 52, and carriage actuator 46 are double-acting hydraulic cylinders or actuators with piston rods that extend and retract from respective cylinders in response to pressurized fluids selectively provided at either end of the respective cylinder. The pressurized fluid or oil is provided to the actuators via a hydraulic control system, as described in previously incorporated U.S. Pat. No. 7,357,435. The left and right lift or support actuators thus may be proportionally controlled, and the actuators on each respective side may extend and retract together or may cooperatively or correspondingly extend and retract, and may extend and retract relative to one another depending on the resistance encountered by each of the actuators with support arms. The left lift actuators thus may be cooperatively controlled or controlled in parallel while the right actuators may be similarly cooperatively controlled or controlled in parallel. Thus, control of the lift actuators on one side relative to the lift actuators on the other side may tilt the frame in a left/right or side-to-side manner, such as shown in FIG. 7. Similarly, the forward lift actuators and rearward lift actuators may be cooperatively controlled or controlled in parallel in order to adjust the height of the cargo trailer or to adjust the fore/aft tilt of the trailer, and may be adjusted in combination with the fore/aft carriage assembly actuator 46 in order to tilt a rearward end of the cargo trailer toward the support surface 34 (FIGS. 4 and 6).

The actuators along each respective side of the cargo carrier trailer may readily extend or retract or float so as to function as a suspension system. For example, when the tire of one of the support arms impacts an object (FIG. 13), the corresponding lift actuator may retract as the support arm pivots rearward and upward in response to the impact. As the lift actuator retracts, fluid or oil from the lift actuator may be forced from that lift actuator to a rearward lift actuator on the same side, which causes the rearward support arm to pivot it downward. Thus, the cargo carrier trailer may be driven or moved over uneven terrain while the tires at the forward and rearward support arms are maintained in engagement with the terrain, even when the obstacles or objects or terrain is substantially uneven.

As shown in FIG. 1, actuators 28 may be partially extended to set the wheels and tires of all four sets of support arms 26a-d at generally the same level, such as for traveling or moving along the support surface or road or ground. As can be seen in FIG. 2, the actuators 28a-d may be fully retracted to lower the frame and deck to a lowest position, so as to provide a low profile or "stealth" orientation, such as for travel along a generally smooth road or non-rough terrain or in low-overhead-clearance areas.

Optionally, the frame and deck may be selectively raised, such as to generally align the deck with another vehicle or loading/unloading surface or platform, such as can be seen in FIG. 3. As shown in FIG. 3, actuators 28a-d are extended to pivot support arms 26a-d downward to raise or elevate frame 12 and deck 14. Actuators 52 of tongue assembly 20 are partially extended to maintain deck 14 in a substantially level orientation. When it is desired to lower the aft end of cargo trailer 10, such as for loading and/or unloading vehicles or materials from deck 14 to the ground or support surface 34, fore/aft carriage assembly actuator 46 may be fully extended to move carriage assembly 16 fully forward along frame portion 12 while further extending actuators 52 of tongue assembly 20, and extending actuators 28a to a maximum extent, extending actuators 28b to a somewhat lesser extent, extending actuators 28c to an even lesser extent, and extending actuators 28d to a minimal extent or leaving them in a retracted position, thus raising the forward end of deck 14 and lowering the aft end of deck 14 toward support surface 34. Thus, the actuators 28, 46, 52 are cooperatively operable to raise the forward end portion of frame 12 and deck 14 while lowering a rearward end portion of the frame toward support surface 34. To facilitate loading and unloading of vehicles or materials from deck 14, a pivotable loading ramp 60 may be pivoted downward (FIG. 4) to span between the aft end of deck portion 14 and support surface 34. The suspension and raising/lowering capabilities and functions of actuators 28 and support arms 26 may be substantially similar to those described in previously-incorporated U.S. Pat. No. 7,357,435.

Figure 12A:
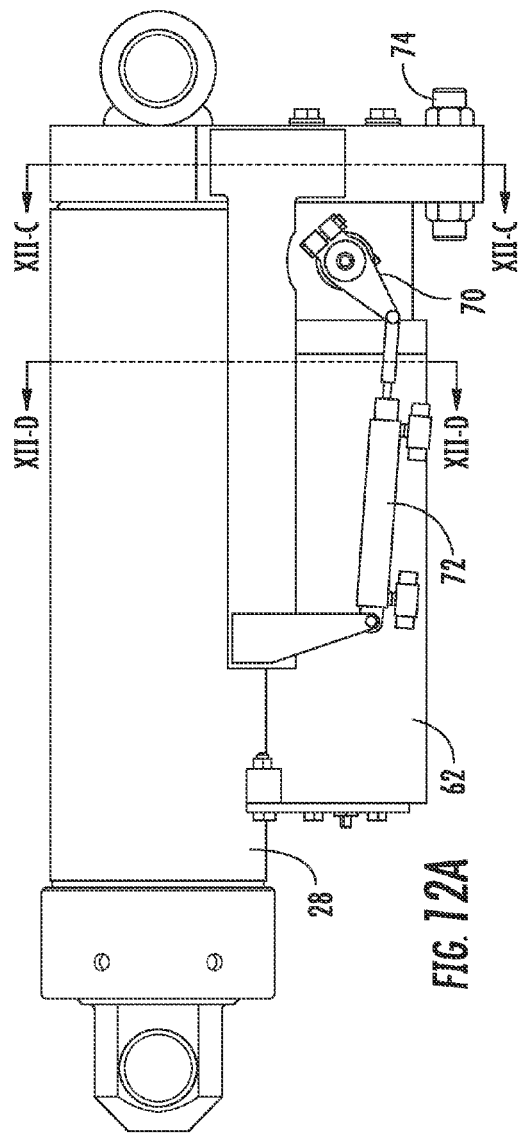
FIG. 12A is an enlarged view of an actuator and accumulator of the hydraulic system of the cargo trailer of the present invention.
Figure 12B:
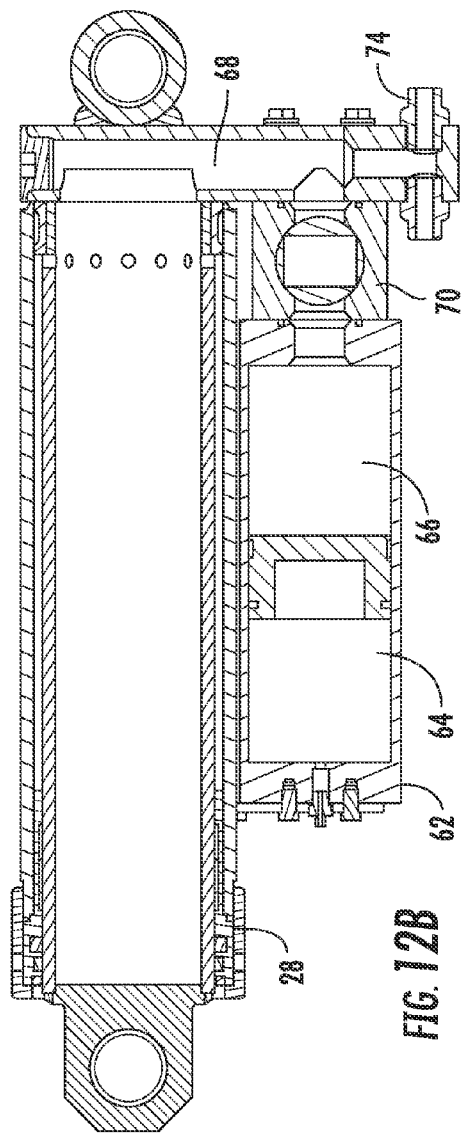
FIG. 12B is a side sectional view of the actuator and accumulator of FIG. 12A.
Figure 12D:
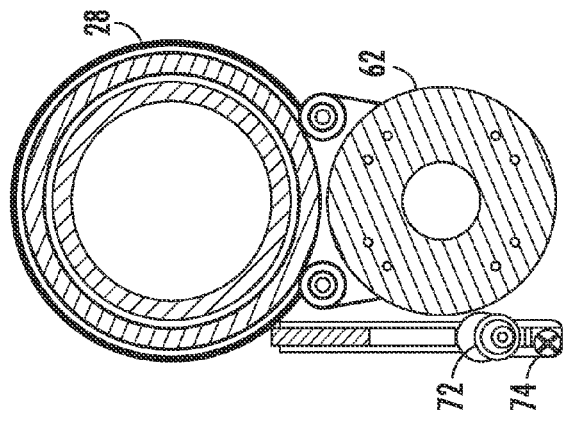
FIG. 12D is an end sectional view of the actuator and accumulator taken along the line XIID-XIID of FIG. 12A.
Figure 12C:
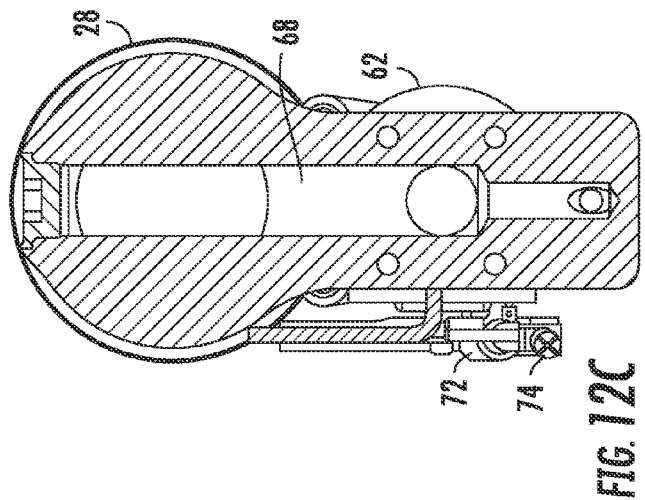
FIG. 12C is an end sectional view of the actuator and accumulator taken along the line XIIC-XIIC of FIG. 12A.

Optionally, and as best shown in FIGS. 6 and 12A-D, the actuators 28a-d may each include an accumulator 62, which may be integral with the respective actuator. The accumulators 62 may be disposed between the support arm 26 and the sub-frame or carriage assembly 16, and with an appropriate mechanical advantage and accumulator size to provide a desired degree of lift and desired suspension characteristics. Each accumulator includes a pressurized gas chamber 64 (such as for storing compressed air or nitrogen or other gas or fluid) and a fluid chamber 66 (FIG. 12B) for receiving oil or hydraulic fluid from the actuators and hydraulic suspension system via a fluid passageway 68 (FIGS. 12B and 12C). The accumulators function to pre-charge or pressurize one end of the respective actuators or cylinders 28 so as to bias the cylinders toward their extended (lifting) state.

Optionally, the hydraulic system of the fifth wheel cargo carrier may include an actuator lock-out valve 70 (such as a quarter turn ball valve or the like) disposed between accumulator 62 and the actuator cylinder 28 so that the accumulator may be locked out or partially locked out, such as when a stable platform is desired such as when loading to and from an aircraft ramp or the like. Lock-out valve 70 is openable to permit hydraulic fluid to flow into fluid chamber 66 of accumulator 62, such as to enhance the shock-absorbing capability of the carriage assembly while the trailer is underway. For example, with lock-out valve 70 open, when a single wheel is jolted upwardly by a road surface irregularity, hydraulic fluid flows out of actuator 28 and into fluid passageway 68, where at least a portion of the fluid enters accumulator 62 rather than forcing all of the fluid into other actuators 28 and driving their respective wheels downwardly. With lock-out valves 70 closed, any fluid forced out of one actuator is matched by an equivalent amount of fluid proportionally entering the other actuators (such as via a fluid line 74, which is in fluid communication with the actuators of the fifth wheel trailer, such as the actuators along one side of the trailer or all of the actuators of the trailer or the like). Optionally, valve actuators 72 (such as hydraulic cylinders or the like) may be provided at lock-out valves 70 to facilitate opening and closing of one or more of the lock-out valves from a remote location (such as a cab of the truck pulling the trailer) and/or to facilitate simultaneous powered opening and closing of two or more of the lock-out valves 70.

Therefore, the present invention provides a fifth wheel cargo carrier trailer with wheels and tires independently mounted to movable or adjustable supports that are adjustable or pivotable relative to a frame and carriage assembly to adjust the height or orientation of the deck or frame, such as for loading or unloading of articles and/or for traveling along the support surface, such as a road or uneven terrain. The cargo carrier trailer has a frame for supporting articles thereon with the frame being raisable and lowerable and tiltable (both fore/aft and left/right) relative to the wheels and tires and support surface or ground via pivotal movement of the support arms. The cargo carrier trailer thus may be readily adjusted via pivotal movement of the support arms, and via fore/aft translation of the carriage assembly, to set the frame (and a deck mounted thereon) at a desired height or tilt angle (including fore/aft tilt and left/right tilt) to ease loading and unloading of the cargo carrier. The support arms and associated actuators function to adjust the height and tilt angles of the frame and also function as a suspension system for the cargo carrier.

Changes and modifications to the specifically described embodiments may be carried out without departing from the principles of the present invention, which is intended to be limited only by the scope of the appended claims, as interpreted according to the principles of patent law.

The embodiments of the invention in which an exclusive property or privilege is claimed are defined as follows:

1. A cargo carrier trailer for movably supporting cargo, said cargo carrier trailer comprising:
    a frame configured to support cargo at said cargo carrier;
    a tongue assembly, said tongue assembly coupled at a forward end portion of said frame and adapted to releasably couple to a fifth wheel receiver of a tow vehicle;
    a carriage assembly movably coupled at said frame and movable longitudinally along said frame;
    at least two wheels at each side of said carriage assembly, each of said wheels being rotatably mounted to a respective support arm, each said support arm being coupled at said carriage assembly, said wheels being independently mounted to the respective support arms;

said support arms being pivotally mounted to said carriage assembly at respective sides of said carriage assembly and being independently pivotable relative to said carriage assembly to adjust height, fore/aft tilt, and left/right tilt of said frame relative to a support surface, wherein said support arms are independently pivotable to (a) position said frame between lowered positions and raised positions for loading and unloading, (b) level said frame when all of said wheels along one side of said carriage assembly are positioned at a different elevation than all of said wheels along the opposite side of said carriage assembly due to said wheels engaging a non-level support surface, and (c) position and level said frame for transporting along varying terrain conditions; and a carriage actuator, said carriage actuator coupled between said frame and said carriage assembly and adapted to move said carriage assembly fore and aft along said frame.

2. The cargo carrier trailer of claim 1, wherein said carriage assembly is positionable in a forward position in which an aft end of said cargo carrier trailer is lowered toward the support surface.

3. The cargo carrier trailer of claim 1, wherein said frame has a deck mounted at an upper surface of said frame, said deck being configured to support cargo at said cargo carrier.

4. The cargo carrier trailer of claim 1, wherein a pair of forward support arms and a pair of rearward support arms are pivotable rearward to adjust a height of said carriage assembly and said frame.

5. The cargo carrier trailer of claim 1, wherein said support arms are cooperatively adjusted so that said cargo carrier trailer is operable to adapt a respective set of support arms and wheels for a different level of the support surface relative to the other support arms and wheels.

6. The cargo carrier trailer of claim 5, wherein said support arms on one side of said cargo carrier trailer are cooperatively adjusted while said support arms on the other side of said cargo carrier trailer are cooperatively adjusted.

7. The cargo carrier trailer of claim 1, wherein said tongue assembly is pivotably coupled at the forward end portion of said frame, said tongue assembly comprising an actuator coupled to the forward end portion of said frame, said actuator adapted to pivot said tongue assembly relative to said frame.

8. The cargo carrier trailer of claim 7, wherein said actuator comprises a double-acting actuator, and wherein said actuator is adapted to extend to raise the forward end portion of said frame and retract to lower the forward end portion of said frame.

9. The cargo carrier trailer of claim 8, wherein said carriage assembly is positionable in a forward position in which an aft end of said cargo carrier trailer is lowered toward the support surface when said actuator extends to raise the forward end portion of said frame.

10. The cargo carrier trailer of claim 1, wherein said support arms are pivoted in response to extension and retraction of a respective support arm actuator.

11. A cargo carrier trailer for movably supporting cargo, said cargo carrier trailer comprising:

a frame;

a tongue assembly, said tongue assembly pivotably coupled at a forward end portion of said frame and adapted to releasably couple to a fifth wheel receiver of a tow vehicle;

a tongue actuator coupled to said tongue assembly and said frame, said tongue actuator adapted to pivot said tongue assembly relative to said frame;

a deck mounted to said frame, said deck being configured to support cargo at said cargo carrier; and a carriage assembly for movably supporting said frame and said deck above a support surface, said carriage assembly including a pair of forward support arms independently pivotally mounted to respective sides of said carriage assembly and a pair of rearward support arms independently pivotally mounted to respective sides of said carriage assembly;

each of said forward and rearward support arms extending from said carriage assembly and having a respective wheel rotatably mounted at an end thereof, said forward support arms being independently pivotable relative to said carriage assembly to adjust a height of a forward portion of said frame relative to the support surface, said rearward support arms being pivotable relative to said carriage assembly to adjust a height of a rearward portion of said frame relative to the support surface, and said forward and rearward support arms being independently pivotable to level said frame when all of said wheels along one side of said carriage assembly are positioned at a different elevation than all of said wheels along the opposite side of said carriage assembly due to said wheels engaging a non-level support surface; and a carriage actuator, said carriage actuator coupled between said frame and said carriage assembly and adapted to move said carriage assembly fore and aft along said frame.

12. The cargo carrier trailer of claim 11, further comprising a pair of middle-forward support arms pivotally mounted to respective sides of said frame and a pair of middle-rearward support arms pivotally mounted to respective sides of said frame, each of said middle-forward and middle-rearward support arms extending from said carriage assembly and having a respective wheel rotatably mounted at an end thereof, to adjust the height of said frame relative to the support surface.

13. The cargo carrier trailer of claim 11, wherein said forward and rearward support arms at each side of said cargo carrier trailer are cooperatively adjusted.

14. The cargo carrier trailer of claim 13, wherein said cargo carrier trailer is operable to adapt said forward and rearward support arms and wheels at one side of said cargo carrier trailer for a different level of the support surface relative to said forward and rearward support arms and wheels at the other side of said cargo carrier.

15. The cargo carrier trailer of claim 11, wherein said support arms are pivoted in response to extension and retraction of a respective support arm actuator.

16. The cargo carrier trailer of claim 15, wherein said support arm actuators comprise hydraulic cylinders of a hydraulic control system.

17. The cargo carrier trailer of claim 16, wherein said hydraulic cylinders at least partially absorb the impact of said wheels against objects as said cargo carrier trailer is moved along the support surface.

18. The cargo carrier trailer of claim 16, wherein said hydraulic cylinders of said forward and rearward support arms at one side of said frame are cooperatively controlled and said hydraulic cylinders of said forward and rearward support arms at the other side of said frame are cooperatively controlled.

19. The cargo carrier trailer of claim 11, wherein said tongue assembly is pivotable relative to said forward end portion of said frame via said tongue actuator, wherein pivotal movement of said tongue assembly when said tongue assembly is connected to the vehicle imparts a lifting force at said forward end portion of said frame.

20. The cargo carrier trailer of claim 19, wherein said carriage actuator is adapted to move said carriage assembly forward via extension of said carriage actuator to facilitate aft tilting of said frame via extension of said tongue actuator.

21. A cargo carrier trailer for movably supporting cargo, said cargo carrier trailer comprising:
   a frame;
   a tongue assembly, said tongue assembly pivotably coupled at a forward end portion of said frame and adapted to releasably couple to a fifth wheel receiver of a tow vehicle;
   a tongue actuator coupled to said tongue assembly and the forward end portion of said frame, said tongue actuator adapted to pivot said tongue assembly relative to said frame;
   a deck mounted to said frame, said deck being configured to support cargo at said cargo carrier; and
   a carriage assembly for movably supporting said frame and said deck above a support surface, said carriage assembly including a pair of forward support arms independently pivotally mounted to respective sides of said carriage assembly and a pair of rearward support arms independently pivotally mounted to respective sides of said carriage assembly, wherein said carriage assembly is repositionable fore and aft along said frame;
   a carriage actuator coupled between said carriage assembly and said frame, said carriage actuator adapted to extend and retract to reposition said carriage assembly relative to said frame;
   each of said forward and rearward support arms extending from said carriage assembly and having a respective wheel rotatably mounted at an end thereof, said forward support arms being independently pivotable relative to said carriage assembly to adjust a height of a forward portion of said frame relative to the support surface, said rearward support arms being pivotable relative to said carriage assembly to adjust a height of a rearward portion of said frame relative to the support surface, and said forward and rearward support arms being independently pivotable to level said frame when all of said wheels along one side of said carriage assembly are positioned at a different elevation than all of said wheels along the opposite side of said carriage assembly due to said wheels engaging a non-level support surface;
   a support arm actuator coupled between said carriage assembly and each of said support arms, said support arm actuators adapted to extend and retract to pivot said support arms relative to said carriage assembly; and
   wherein said support arms are adapted to raise and lower respective portions of said deck to effect at least one of tilting said deck fore and aft, tilting said deck left and right, raising said deck in a generally level orientation, and lowering said deck in a generally level orientation.

22. The cargo carrier trailer of claim 21, wherein said tongue actuator, said carriage actuator, and said support arm actuators are cooperatively operable to raise the forward end portion of said frame while lowering a rearward end portion of said frame to the support surface.

* * * * *

UNITED STATES PATENT AND TRADEMARK OFFICE
CERTIFICATE OF CORRECTION

PATENT NO. : 8,317,215 B2  
APPLICATION NO. : 12/489828  
DATED : November 27, 2012  
INVENTOR(S) : Quenzi et al.

Page 1 of 1

It is certified that error appears in the above-identified patent and that said Letters Patent is hereby corrected as shown below:

In the Specification

Column 1
Line 40, "adjustable" should be "adjustably"
Line 64, Delete "-" before toward Column 3
Line 54, ";" after 26b should be ","

In the Claims

Column 10
Claim 12, Line 33, "anus" should be "arms"
Claim 12, Line 37, "anus" should be "arms"
Claim 13, Line 41, "anus" should be "arms"

Signed and Sealed this
Eighth Day of April, 2014

Michelle K. Lee
*Deputy Director of the United States Patent and Trademark Office*